United States Patent [19]
Ludlow

[11] Patent Number: 5,474,673
[45] Date of Patent: Dec. 12, 1995

[54] TOP MOUNTED BIOLOGICAL FILTRATION SYSTEM FOR AN AQUARIUM

[76] Inventor: David J. Ludlow, 3616 Elmwood St., Salt Lake City, Utah 84106

[21] Appl. No.: 271,089

[22] Filed: Jul. 5, 1994

[51] Int. Cl.⁶ ............................................. A01K 63/04
[52] U.S. Cl. .................. 210/151; 210/169; 210/184; 210/248; 210/255; 210/262; 210/416.2; 119/260; 119/262
[58] Field of Search .................................. 210/150, 151, 210/169, 175, 181, 184, 185, 248, 255, 416.2, 262; 119/259, 260, 261, 262

[56] References Cited

U.S. PATENT DOCUMENTS

| | | | |
|---|---|---|---|
| 3,468,288 | 9/1969 | Cassil | 119/5 |
| 3,566,840 | 3/1971 | Willinger | 119/5 |
| 3,892,199 | 7/1975 | Huyler | 119/260 |
| 4,151,810 | 5/1979 | Wiggins | 119/5 |
| 4,816,465 | 8/1989 | Augustyniak | 210/169 |
| 4,988,436 | 1/1991 | Cole | 210/169 |
| 5,084,164 | 1/1992 | Del Rosario | 210/169 |
| 5,096,576 | 3/1992 | Szabo | 210/169 |
| 5,097,795 | 3/1992 | Adey | 210/169 |
| 5,139,569 | 8/1992 | Scott | 210/169 |
| 5,234,581 | 8/1993 | Rosenberg | 210/169 |

FOREIGN PATENT DOCUMENTS

| | | | |
|---|---|---|---|
| 2215229 | 9/1989 | United Kingdom | 210/169 |
| 2248558 | 4/1992 | United Kingdom | 210/169 |

OTHER PUBLICATIONS

"The Gemini Modular Filtration System" Aquarium Products.
"Blue Thunder, . . . etc." Various advertisements abt. 1992.
Weiss, M. "Wet–Dry Filtration . . . " Discus Annual 1992, pp. 135–141.
Wilkens, P. "Technological Overkill?. . . " Tropical Fish Hobbyist, Feb. 1992 pp. 44–51.
"What are Beads and Stars" Aquarium Pharmaceuticals Inc., 1990.

Primary Examiner—Robert A. Dawson
Assistant Examiner—Robert James Popovics
Attorney, Agent, or Firm—James L. Sonntag

[57] ABSTRACT

A wet/dry filter system that is mounted on the top of an aquarium allows flexible flow control to and between the wet section and the dry section.

17 Claims, 5 Drawing Sheets

TOP MOUNTED BIOLOGICAL FILTRATION SYSTEM FOR AN AQUARIUM

FIELD OF THE INVENTION

This invention relates to water filtration or purification systems, particularly as used for fish aquaria.

BACKGROUND OF THE INVENTION

In fish aquaria used by hobbyists and professional fish breeders it is necessary to establish and maintain an environment that is not only habitable for the fish, but is as close as possible to the native environment of the fish. This is particularly important for breeding pairs, since even a small amount of environmental stress will prevent successful breeding for many species. While an aquarium soon after filling with fresh water usually has a suitable environment, nitrogenous wastes, such as left-over food, fecal and other aquatic life excretions, and other decaying plant/animal materials, are introduced over time into the aquarium. The nitrogenous wastes then break down through bacterial action into ammonia ($NH_3$). Ammonia is very toxic, particularly to certain exotic fish species that are popular among aquarium owners. If the ammonia is not removed or transformed into a less toxic substance, the aquarium environment quickly degrades as the ammonia concentration climbs until it will no longer support fish life.

Some fish breeders solve the ammonia build-up problem by replacing a significant portion of the aquarium water, either continuously or at regular intervals. However, this is usually a laborious practice and impractical for most hobbyists and fish breeders. Accordingly, the aquarium water is usually circulated through filters or purifiers, or the like, to remove the ammonia and then recirculated back into the aquarium. The term "filter," as used herein and in the aquarium art, encompasses any device that removes undesirable substances from the water, whether dissolved chemical substances, or as solid particulates.

There are many types of filters available that operate on the basic principle of circulating water from the aquarium through a filter medium and then back into the aquarium. The medium in these filters is usually a medium for removing solid particles, e.g., floss, or a medium, such as activated carbon, or an ion exchange resin, that removes dissolved gasses or other dissolved substances.

While such simple filters are straight forward and relatively inexpensive, they are usually inadequate for large volume aquaria, or for sensitive fish species, s particularly breeding these fish species. For example, fresh water fish of the Cichlid family, commonly known as the discus fish, will breed only in very clean and quiescent water. In addition, these fish are sensitive to ammonia. Even a small concentration of ammonia in the aquarium water will stress the discus fish sufficiently to prevent breeding and will also render the fish more susceptible to disease.

Ammonia is naturally removed to a small degree from the aquarium by transformation into nitrites and then to nitrates by, for example, nitrosomonas and nitrobacters bacteria. However, unless artificially cultivated, there is an insufficient bacteria population to transform the i ammonia generated in the aquarium. An attempt to exploit this natural process is provided by the subgravel filter. In this filter water is sucked through the bottom gravel of the: aquarium by means of a plate under the gravel. However, it has been found that in order for sufficient ammonia to be removed by bacterial action, a large surface area must be provided as a habitat for the bacteria. With subgravel filters, there are usually dead spots through which water does not circulate, and even without the dead spots the surface area of the gravel is usually insufficient for an adequate bacteria population. Accordingly, a further means for removing the ammonia, or a large water replacement is also required to maintain the aquarium environment.

In conventional filters where water is siphoned into the filter box, passed through a medium and pumped back into the aquarium, there have been attempts to introduce a medium that provides a substrate for growing the bacteria that break down harmful substances. These include shapes of inert material, such as plastic, open pore plastic foams, and mineral substances pressed into shapes, such as diatomaceous earth. However, it has been found that merely adding a substrate for bacteria growing to a conventional filter does not always provide the bacterial population necessary to provide the required ammonia conversion, particularly where there is a high fish density.

One reason such is that the filters provide insufficient surface area for an adequate bacteria population. Even if the medium may have a high surface area, there is typically little environmental control to optimize the bacteria population. It has also been s found that optimal environments differ for the various bacteria that transform ammonia to nitrites, and nitrates. Some bacteria are "aerobic" and grow best in a highly aerated environment. Other bacteria varieties grow best in an "anaerobic," or less aerated environment or oxygen depleted environment. While many filters, both conventional and under-gravel filters, may support both types of bacteria, the environment of the filter medium is not well controlled, and it is impossible to establish or maintain the filter medium conditions for the optimal growth of both types of bacteria. In addition, the ideal balance between aerobic and anaerobic bacteria populations varies considerably, due to fish types and population density. Also, in a system with a high ammonia removal rate using a high anaerobic bacteria population, the anaerobic bacteria population can deplete dissolved oxygen in the water. Therefore, an anaerobic population which is higher than is necessary is undesirable. However, conventional and under-gravel filters typically have inadequate means to control the density or balance of bacteria population.

In an attempt to provide a large surface area, and provide an optimum bacteria habitat for both aerobic and anaerobic bacteria, so-called wet-dry filters have been developed. These filters comprise a "dry" section that includes a relatively large chamber filled with a medium or packing, e.g., plastic beads, or the like. Water is trickled down through to wet the surface of the medium of the dry section, which provides an aerobic habitat for bacteria.

The water then enters the "wet" section. The wet section is distinguished from the dry section in that the packing or medium of the wet section is submerged in water, or "wet," as opposed to being "dry" with water percolated over its surface. The packing of the wet section is typically an open cell foam, which provides interior spaces, which provide a sufficiently oxygen depleted environment for anaerobic bacterial growth.

The volume of the dry section in prior-art filters is quite large, e.g., typically about 2 cubic feet for a 110 gallon aquarium. This is equivalent to about 30 cubic inches per gallon aquarium capacity. The volume is required to provide sufficient medium surface area for bacterial growth for any medium that may be used, which is often spherical or shapes of plastic shapes. In addition, the dry section is typically placed above the wet section, typically separated therefrom by a perforated plate to support the dry section medium and allow water to pass into the wet section. Combined with the large dry section, this requires that the filter be relatively large and high. For this reason, the only suitable space for the filter is usually under the aquarium.

In a typical wet-dry filter system, water is drawn from the aquarium through siphon tubes into a prefilter box mounted on the back of the aquarium. The prefilter box provides one or more chambers, one usually containing a prefilter medium, e.g., floss, which removes large particles from the water.

From the prefilter, water flows down through a flexible tube into the filter assembly and onto a diffuser plate at the top of the dry section. The water then trickles through the dry section, through the perforated plate, and into the wet section. Typically the medium in the wet section is supported by a perforated plate spaced above the bottom of the filter to allow water leaving through the bottom of the wet section to pass laterally into a sump disposed to the side of the wet section. During normal operation of the filter, the wet section is maintained in a submerged state in a portion of the sump. From the sump the water is then pumped back into the aquarium.

While the prior-art wet-dry filters are generally successful, they are subject to many operating difficulties. These difficulties derive mainly by the large volume of these filters. The size of the total assembly, the dry filter chamber and wet section/sump chamber, usually ranges from 2 to 3 feet long, and 1 to 2 feet high for filters of 100 to 400 gallon capacity. During operation of the filter, the wet section and the sump contain several gallons of water. If the circulation of this large volume of water is disrupted, either the aquarium or filter can overflow. For example, if there is a power failure and the pump stops, water will continue to flow: through the prefilter until the water level in the aquarium lowers to the level of the overflow baffle in the prefilter. However, if the water level is high in the aquarium the water flow may continue long enough to fill the sump, dry and wet sections, and overflow the filter. In addition, if the prefilter becomes clogged, even partially, and insufficient water flows from the prefilter, the pump can empty the sump and wet section into the aquarium. If the water level in the aquarium is high and them is insufficient excess capacity, the aquarium will then overflow. On the other hand if the water level in the aquarium is too low, the siphons into the prefilter will fail or the water in the prefilter will not rise sufficiently to flow over the baffle. The pump will then pump the filter dry, and if left on without water circulating through it, will burn out.

In summary, proper:operation of a wet-dry filter requires careful and frequent monitoring of the water level of the aquarium to prevent either a burned out pump or a flooded floor. This can become burdensome since the range between "too low" and "too high" for the aquarium level is quite narrow. The problem is aggravated by the large evaporating surface in the dry section.

The high evaporation rate not only requires a frequent monitoring of the water level, but also creates an undesirable humid condition in the confined space under the aquarium. Often the space under an aquarium is closed and used for auxiliary equipment, food storage, and the like. Thus, the placement of the filter under the aquarium creates a contained humid atmosphere, which contributes to corrosion of the equipment and deterioration of the food. This is a particular problem for salt-water aquaria, in which the filter also generates a salt-water mist.

The large volume of the wet-dry filter is required, not only because of the large volume of the dry section medium, but also to provide a large sump for the pump. The sump must be relatively large to accommodate fluctuations in the flow of water. Therefore, a significant volume of the filter is essentially empty space and makes no contribution to the purifying of the water. In addition, where a low ammonia removal rate is required, it is may be desirable to remove the wet section to prevent excessive oxygen depletion. In a conventional wet-dry filter, this can be provided by removing the medium. However, the volume formally occupied by the wet section medium, since it is flooded, cannot be used for additional dry medium, contributing to more wasted filter volume.

The sequential construction of prior-art wet-dry filters also does not permit flexibility in tailoring the flow of water through the wet and the dry sections. Basically, the same water flow goes through both the wet and the dry sections. It would be desirable to permit, for example, more water to flow through a dry section than through the wet section where the user requires more of the purification action from the dry-section. Alternately, it may be desirable to have a small or no flow through the dry section and a large flow through the wet section. Other variations may also be desirable.

Another problem with prior-art wet-dry filters is that they are usually quite noisy, aggravated by the fact that relatively high powered centrifugal pumps are required to pump a high volume of water from underneath the aquarium up to the aquarium top, against a water head typically from three to five feet. In addition, they are burdensome to clean. Cleaning requires that the filter be emptied, which often involves discarding and replacing the high water volume in the filter. Since the filters are usually underneath the aquarium, access into the dry and wet sections from the top is limited, which adds to the difficulty of replacing or cleaning the wet and dry section medium.

Mounting of a wet-dry filter in the back of the aquarium has been suggested. However, because of the large volume of the filter, the width of the aquarium must be significantly reduced or the aquarium/filter assembly becomes so wide it is unattractive and extends too far into the room. Mounting a wet-dry filter on the top of the aquarium would block most of the top access into the aquarium and would preclude the use of fluorescent light strips on the top. Accordingly, top-mounted filters are usually not of the wet-dry type but are small and of simple design, e.g., a simple trickle type or a type using filter canisters.

Another common problem, not only of prior-an wet-dry filters, but also of several filters where water is pumped by centrifugal pumps into and/or out of the aquarium, is that excessive turbulence is often created in the aquarium. Often a rough current from a single pump out-flow to the siphon inlets exists, which is undesirable for fish requiring quiescent water. In addition, prior-ann filters, because of the placement of the filter inlets and outlets, often provide a poor circulation pattern in the aquarium. Ideally, the water circulation should comprise slow circular currents extending through the volume of the aquarium. Instead, the circulation is often a strong current between the pump outlet and the siphons with significant regions that are more or less stagnant. This results in regional variations of concentration of dissolved substances, such as oxygen and pollutants, such as ammonia, and provides inefficient filtering of the water in the stagnant regions.

Another problem with prior-ann filters involves the heater. A means sometimes used for heating water in aquaria with wet-dry filter systems is to place a conventional submersible aquarium heater in the sump from which water is pumped back into the aquarium. In the event of a siphon failure, the sump will be pumped dry and the heater is likely to burn out. In addition, if the aquarium user forgets to turn off the heater when he empties the filter for cleaning or maintenance, the heater will burn out.

OBJECTS OF THE INVENTION

It is, therefore, an object of the invention to provide a wet-dry filter system, which avoids the problems of circulating a large volume of water in and out of the aquarium.

It is also an object of the invention to provide a wet-dry filter that will not flood or overflow if the water circulation is ;stopped or impeded, for example by a pump failure or clogged filter medium.

It is also an object of the invention to provide a wet-dry filter that occupies a relatively small volume.

It is also an object of the invention to provide a wet-dry filter in which water flow through the filter can be controlled, i.e., permitting diversion of a portion of the stream past either the wet section or the dry section.

It is also an object of the invention to provide a wet-dry filter that is small enough that it can be mounted on the top of an aquarium while allowing top-access to the aquarium and providing space for a fluorescent light fixture.

It is also an object of the invention to provide a wet-dry filter that functions independently of the water level in the aquarium.

It is also an object of the invention to provide a wet-dry filter that can be easily maintained and cleaned.

It is also an object of the invention to provide a wet-dry filter and aquarium system that can maintain an aquarium heater submersed in water while the filter or aquarium is emptied or while the level of water in the aquarium is low.

Further objects of the invention will become evident in the description below.

SUMMARY OF THE INVENTION

An embodiment of the invention is an apparatus for cleaning water that is contained in an aquarium, the aquarium constructed and arranged to provide an upper surface of the water, the apparatus comprising;

(a) a main chamber with a top end and a bottom end and defined as the volume enclosed by generally vertically aligned side-walls disposed above the surface of the water of the aquarium, (b) a dry section disposed within the main chamber defined by a bottom dry section plate aligned in a generally horizontal alignment with dry medium containment walls extending from the dry section plate constructed and arranged to contain a dry medium, the dry section plate having a means constructed and arranged for the passage of sufficient water through the plate such that water trickles through the dry medium with at least a major portion of the dry medium being not submerged in water during operation of the apparatus, (c) a wet section disposed within the main chamber with a wet section bottom plate and wet section sidewalls extending upward from the wet section bottom plate defining a containment for water, at least one side wall having an overflow weir for maintaining a predefined water level in the containment, and a wet medium with the major portion of the wet medium; disposed to be submerged below the water level in the wet section.

(d) an inlet conduit including a pump means for directing water from the aquarium to a water inlet of the main chamber, and (e) a channel within the main chamber to provide a path for water flow from the inlet to the wet section and the dry section, the channel including a wet section inlet weir and a dry section inlet weir with the wet section disposed relative to the wet section inlet weir such that water flowing from the channel over the wet section inlet weir flows into the wet section, and with the dry section disposed relative to the dry section inlet weir such that water flowing from the channel over the dry section inlet weir flows into the dry section.

The term "filter," as used herein, is used the same as commonly used in the aquarium industry, and refers to devices that remove solid materials and to devices that remove dissolved substances from water.

The main chamber is defined by generally vertically aligned side-walls disposed above the surface of the water of the aquarium. Preferably the main chamber is rectilinear in cross-section with four vertical walls, but may be any suitable shape, e.g., ovoid or circular.

Within the main chamber is a dry section that contains dry medium. The dry medium is supported by a generally horizontal dry section plate with holes, or the like, allowing water to percolate through the dry medium and through the dry section plate without submerging the dry medium.

The dry medium is any suitable medium that provides a surface area suitable for the growth of aerobic bacteria. Preferably the surface area per unit volume of medium is sufficiently high to permit a dry section volume of less than about 5 cubic inches per gallon of aquarium capacity. As used herein, unless otherwise specified, reference to surface area of a medium refers to surface area capable of supporting bacteria for the conversion of ammonia.

Industry practice is to provide between about 2 and about 5 square feet of surface area per gallon aquarium capacity. Preferably, in the present invention, the surface area exceeds the industry practice, greater than about 5 square feet per gallon. In the particular example below, 10 square feet per gallon are provided.

In particular, the dry section may have a volume between about 0.1 and about 5, preferably between about 0.1 and about 2, more preferably between about 0.2 and about 1 cubic inch per gallon aquarium capacity. The small volume of the dry section allows construction of a relatively small filter assembly on the top of an aquarium, and also permits construction of the removable wet section as described for Embodiment A below.

A preferred medium is a porous material with pores large enough to allow infiltration into the pores and colonization inside the pores of nitrifying bacteria. Such bacteria are typically about 1 micron wide and 2 microns in length. A suitable dry section medium is porous mineral substances pressed into shapes, such as diatomaceous earth or perlite. The mineral substances are preferably free of soluble minerals which may pass into the aquarium water. In addition, the medium should allow infiltration and sufficient oxygen to maintain an aerobic environment at the bacterial growing surfaces, i.e., prevent depletion of the oxygen by the bacteria and prevent anaerobic zones from forming. The use of a medium that provides a large surface for an aerobic environment per unit volume is desired.

Preferably the dry section medium comprises diatomaceous earth shapes which are commercially available under the names "Bio-Chem Stars" and "Bio-Chem Beads" from Aquarium Pharmaceuticals, Inc. These shapes have an average pore size between about 5 and 50 microns. The Bio-Chem Star shapes are extruded star shapes and have a surface area for-bacterial growth of between about 20 and about 100 ft$^3$ (0.5–3 m3) per star. The manufacture recommends that the one star be used for every two gallons of aquarium capacity. This is equivalent to between about 10 and about 50 ft$^2$ of surface area for each gallon of aquarium capacity. The surface area per unit volume medium depends on the packing of the shapes but typically varies between about 300 and 2,200 stars per cubic foot. This would be about 6,000 to about 220,000 square feet surface area per cubic foot of medium, depending upon the particular surface area per star. Bio-Chem Beads are the same material as the stars formed into generally spherical beads between about 1 mm and 4 mm in diameter.

A wet section is disposed within the main chamber and comprises a wet section plate and upwardly extending containment walls or sidewalls to form a water containment. At least one of the sidewalls has an overflow weir for maintaining a predefined level of water in the containment. During operation of the filter, the containment is full of water with a wet medium submerged in the water. The wet medium is any medium typically used for wet,medium. A suitable medium provides a surface area for the colonization of bacteria in which oxygen becomes depleted, providing an anaerobic environment. Suitable materials include sintered glass, and open pore foams such as artificial and natural sponges. Since the wet section extends across most of the width of the main chamber, the vertical thickness of the wet section medium can be relatively small, between about 0.5 and 2 inches, preferably about 1 inch. By varying the thickness, and hence the volume of the wet section media, the anaerobic bacterial population can controlled.

During operation of the filter, a pump means conveys water from the aquarium through the inlet means into the top of the filter. Since the water is conveyed from the aquarium with pumps, operation of the filter is independent of the aquarium water level, unlike filters with siphon inlets.

After entering the filter, the water percolates through the dry medium and is treated by the action of aerobic bacteria. The water then passes into the wet section where it is treated by action of anaerobic bacteria, and then flows down into the aquarium. The pump means are preferably submersible pumps disposed in a suitable mounting in the aquarium. This provides a quieter pumping system. Externally mounted centrifugal pumps may be used, but since the head against which the pump raise water is not large, the typically less powerful but quieter submersible pumps are preferred. In addition, with submersible pumps, the pump will not overheat and fail in the event the pump inlet is clogged.

Preferably a means to distribute water over the top of the dry medium is provided, e.g., a perforated distribution plate, perforated tube, and/or a rotating distributor. Preferably a perforated distribution plate is placed above a dry medium, and sufficient volume provided in the main chamber above the distribution plate for a prefilter medium. A prefilter medium removes the larger solid components in the water, often a polymeric floss material. Preferably, the distribution plate may provide a prefilter overflow weir means to allow water to bypass the prefilter medium and flow into the dry section in case the prefilter medium becomes clogged. The non-clogging prefilter system provides a filter system that only under the most extreme circumstances will become clogged and overflow. The other sections of the filter will normally not clog, since the medium in the dry section is rather coarse to permit permeation of oxygen for an aerobic environment, and the medium is often formed into shapes that are not densely packed. Therefore, the dry medium rarely, if ever, becomes clogged. In addition, the wet section inherently provides a weir overflow in the containment and will not easily become blocked.

By providing a prefilter overflow, water is merely bypassed into the dry section instead of filling above the prefilter and overflowing out of the filter assembly. The placement of the prefilter within the main chamber above the dry-section is possible since the filter can be mounted above the aquarium, which eliminates the need for a separate siphon prefilter box assembly typically used to withdraw water from the aquarium in prior art systems. Since there are essentially no elements in the present filter that will block the flow of water through the filter, and there are no siphons that either fail or continue to draw water when the filter pump fails, the opportunities for clogging, blocking or flooding of the filter are essentially eliminated.

Since the filter has a relatively small volume, the normal excess capacity of the aquarium can contain any failure i of the filter. Assuming there is a disruption of the water flow there is no large filter volume that can be pumped dry. The only excess flowing into the aquarium would be the water trickling through in the dry section and prefilter, with water remaining in the small containment of the wet section. There are no large sumps or the like which will empty into the aquarium in the event of a failure. Pump failure, or a clogging of a pump inlet, would only prevent the filter from purifying the water, and only in the most extreme circumstance, such as failure of a pump line, will there be equipment damage or overflowing onto the floor. In addition, the present invention permits a modular construction to allow easy disassembly for repair and correction of any problems.

Since the filter of the invention is mounted above the water surface, it is simple to incorporate a distribution means, such as a plate at the outlet to distribute the water flow over a larger surface of the aquarium water. Since these distribution means can be incorporated integrally into the filter, there is no need for additional and bulky distribution tubes and the like. The distribution means can be easily modified to create the desired circulation pattern in the aquarium. The water may be distributed in a region near the center of the aquarium and extending from the front to the back, with the inlets for the pump or pumps near the back corners of the aquarium. This creates a slow circular circulation through most of the aquarium volume. The slow circular circulation pattern creates on non-turbulent environment through most of the aquarium, and has been found to effectively remove debris from the bottom of the aquarium and circulate such through the filter for removal. Since the Circulation pattern extends throughout most of the aquarium and there is a minimum of dead spots, areas on the aquarium bottom where debris, uneaten food, etc., collect are essentially eliminated.

In an embodiment of the invention the apparatus comprises a main chamber, essentially as described above, with a top end and a bottom end and defined as the volume enclosed by generally vertically aligned side-walls disposed above the surface of the water of the aquarium. Also included in this embodiment is a dry section disposed within the main chamber defined by a bottom dry section plate aligned in a generally horizontal alignment with dry medium containment walls extending from the dry section plate constructed and arranged to contain a dry medium. The dry medium is the same medium as described above, and preferably comprises essentially spherical beads of diatomaceous earth (available under the name "Bio-Chem Beads", above). The dry section plate has a means constructed and arranged for the passage of sufficient water through the plate so that water trickles through the dry medium, where at least a major portion of the dry medium is not submerged in water during operation of the apparatus.

The wet section is disposed within the main chamber with a wet section bottom plate and wet section sidewalls extending upward from the wet section bottom plate defining a containment for water, at least one sidewall having an overflow weir for maintaining a predefined water level in the containment. A wet section medium with the major portion of the wet medium submerged below the water level is placed in the wet section. The wet section medium is the same as described above.

A heater chamber may also be provided. The heater chamber comprises a bottom panel and side panels extending upward from the bottom panel defining a containment. The containment is constructed and arranged to contain water and a submersible water heater. At least one of the sidewalls has an overflow weir to maintain a predefined water level in the heater chamber such that the submersible heater is submerged below the water level.

In a preferred embodiment the heater is disposed below the wet section. In this embodiment, the heater chamber and the wet section containment are the same, with the wet section separated from the heater chamber by a wet medium support plate. The wet medium support plate is perforated to allow water to flow down through the wet medium, through the support plate and into the heater chamber. The overflow weir which controls the water level in the common wet section containment/heater chamber maintains the water level to cover the wet section medium and the electrical heater below it. It is also understood that the side walls or bottom panels of the main chamber, the dry section, the wet section, and the heater chamber be provided by common panels where appropriate.

An inlet conduit, which includes a pump means is provided for directing water from the aquarium to the main chamber. In a preferred embodiment the water from the aquarium is introduced into a channel within the main chamber. The channel provides a path for water flow from the inlet to the wet section and the dry section. The channel includes a wet section weir and a dry section weir. The wet section is disposed relative to the wet section weir such that water flowing from the channel over the wet section weir flows into the wet section. Likewise, the dry section is disposed relative to the dry section weir such that water flowing from the channel over the dry section weir flows into the dry section.

By using a common channel as the water source for both the dry section and the wet section, several advantages can be achieved that are not possible with prior art systems. The main advantage is that the water into the filter can be divided by any proportion between the wet section and the dry section. For example, all of the water could be directed to the dry section, or all to the wet section, or any proportion to the wet section with the remaining flow to the dry section. The method of redirecting or proportioning the water may be accomplished by any suitable means, e.g., flow restrictors or diverlets in the channel, variation between the relative heights of the dry section weir and the wet section weir, or any combination of these. The function of these means is to favor the flow of water to either the wet section weir or the dry section weir. A flow restrictor may be a panel placed in the flow path of the channel which dams the flow. The panel may have an overflow weir, or have apertures to allow some flow of water but raise the water head on the upstream side to cause an increase flow over the weir or weirs upstream from the panel. The relative heights of the dry section and wet section weirs may be adjusted to vary the flow over each respective weir. The height may be made adjustable by use of removable inserts, sliding panels, or the like.

Another advantage is that it is simple to enlarge the capacity of the apparatus of the invention by adding more weirs on the channel with appropriate sections. In the prior-art, the typical way of increasing capacity is by increasing the width or the height of a single section, which respectively leads to problems in water distribution or creates a unit too high to conveniently fit on top of the aquarium. In the example illustrated in FIGS. 1 to 5, an apparatus with two wet sections on either side of a single dry section is illustrated. However it is understood that any number of sections may be possible, by adding sections to either side of the channel or by extending the channel.

Another advantage is that in the event that a section becomes clogged, e.g., the wet section, rather than the filter flooding, the water will be directed over the weir of the remaining sections. For, example in the embodiment illustrated in FIGS. 1 to 5, it will be rare that both wet sections will clog at the same time, and dry sections usually do not clog. Thus, a clogged wet section will result in a increased flow into either or both of the other wet section and dry section.

After flowing from the wet section or dry section, the water may be directed into the aquarium or redirected into another section for further treatment, or into a heater chamber for heating. In the embodiment illustrated below in FIGS. 1 to 5, the water from the wet section weir flows through the wet medium in a common wet section containment/heater chamber, and over an electrical heater. The water then flows through a gap in a sidewall of the wet section, and over a weir into the dry section. It is understood, however, that water may be directed from the dry section to the wet section (by for example, placing the water outlet of the dry section above the water level of the wet section and allowing water to flow by gravity), or the water may be directed to further treatment or allowed to merely flow into the aquarium from either or both sections.

Figure 1:
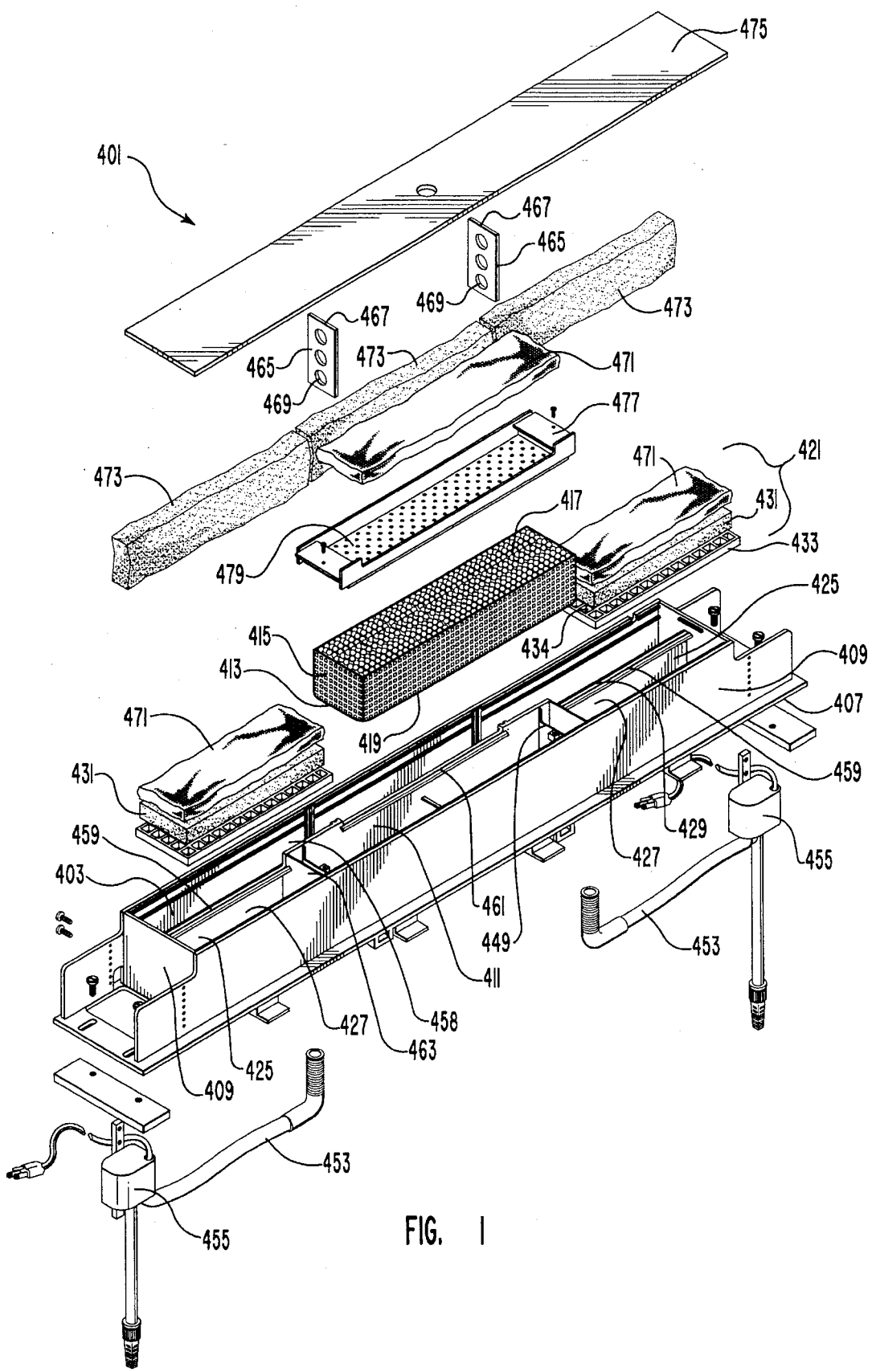
FIG. 1 is an exploded view of an embodiment of the invention.

| Sequential List of Reference Numbers in the drawings | |
|---|---|
| 401 | filter |
| 402 | aquarium |
| 403 | main chamber |
| 404 | water level |
| 405 | top end |
| 407 | bottom end |
| 409 | main chamber side walls |
| 411 | dry section |

-continued

Sequential List of Reference Numbers in the drawings

| | |
|---|---|
| 413 | dry section plate |
| 415 | dry medium containment walls |
| 417 | dry medium |
| 419 | apertures in dry section plate |
| 421 | wet section |
| 423 | wet section bottom plate |
| 425 | wet section side walls |
| 427 | wet section containment |
| 429 | wet section overflow weir |
| 430 | wet section water level |
| 431 | wet section medium |
| 433 | wet medium support plate |
| 434 | aperture in support plate |
| 435 | heater chamber |
| 437 | heater chamber bottom panel |
| 439 | heater chamber side panels |
| 441 | heater chamber bottom panel |
| 445 | heater chamber containment |
| 447 | submersible heater |
| 449 | heater chamber overflow weir |
| 451 | heater chamber water level |
| 453 | inlet conduit |
| 455 | pump means |
| 457 | water inlet |
| 458 | channel |
| 459 | wet section inlet weir |
| 461 | dry section inlet weir |
| 463 | wet section curtain wall |
| 465 | flow restrictors |
| 467 | flow restrictor panels |
| 469 | flow restrictor apertures |
| 471 | toss |
| 473 | course filter material |
| 475 | top lid |
| 477 | distribution plate |
| 479 | apertures of distribution plate |

DETAILED DESCRIPTION OF THE INVENTION

Figure 2:
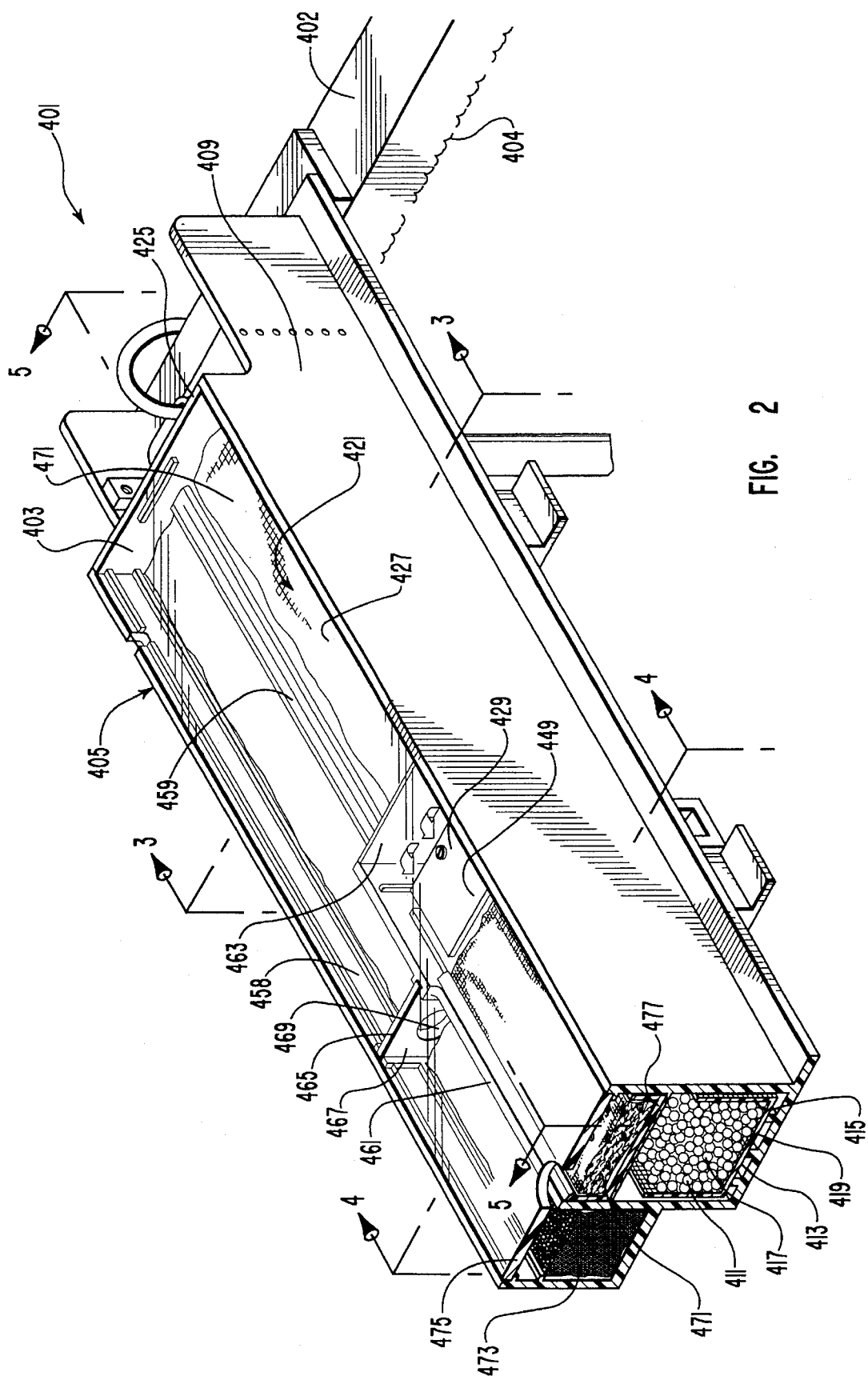
FIG. 2 is a perspective view, with cross section at 2 in FIG. 1.

FIGS. 1 to 5 illustrate; an embodiment of the invention wherein the inlet is connected to the wet section and the dry section by a channel. Referring to FIGS. 1 and 2, shown is an apparatus 401 of the invention. The apparatus is fitted upon the top of an aquarium 402 above the water level 404, such as shown in FIG. 2, where the aquarium is shown in partial cutaway. A main chamber 403 has a top end 405 and a bottom end 407, and is defined as the volume enclosed by generally vertically aligned side-walls 409.

A dry section 411 is disposed within the main chamber 403 and is defined by a bottom dry section plate 4 13 aligned in a generally horizontal alignment with dry medium containment walls 415 extending from the dry section plate 413 constructed and arranged to contain a dry medium 417. The dry section plate 413 has a means, such as apertures 419, for the passage of sufficient water through the plate. Water passing through the dry section 411 trickles through the dry medium 417 such that at least a major portion of the dry medium 417 is not submerged in water during operation of the apparatus.

A wet section 421 is disposed within the main chamber 403 with a wet section bottom plate 423 and wet section sidewalls 425 extending upward from the wet section bottom plate 423 defining a containment 427 for water. At least one side wall comprises an overflow weir 429 for maintaining a predefined water level 430 in the containment. A wet medium 431 is in the containment with the major portion of the wet medium 431 submerged below the water level. In FIG. 1, two wet sections 421 are shown. Each wet section 421 is adjacent the centrally located dry section 411, and the wet section side wall 425 with the wet section overflow weir 429.

A wet section side wall 425 may also function as the medium containment wall 415 for the dry section 411. However, in the illustrated embodiment, the containment walls 415 extend from the dry section plate 413 to form a basket like container for the dry medium 417. The basket can be easily removed to clean or replace the dry medium.

Figure 5:
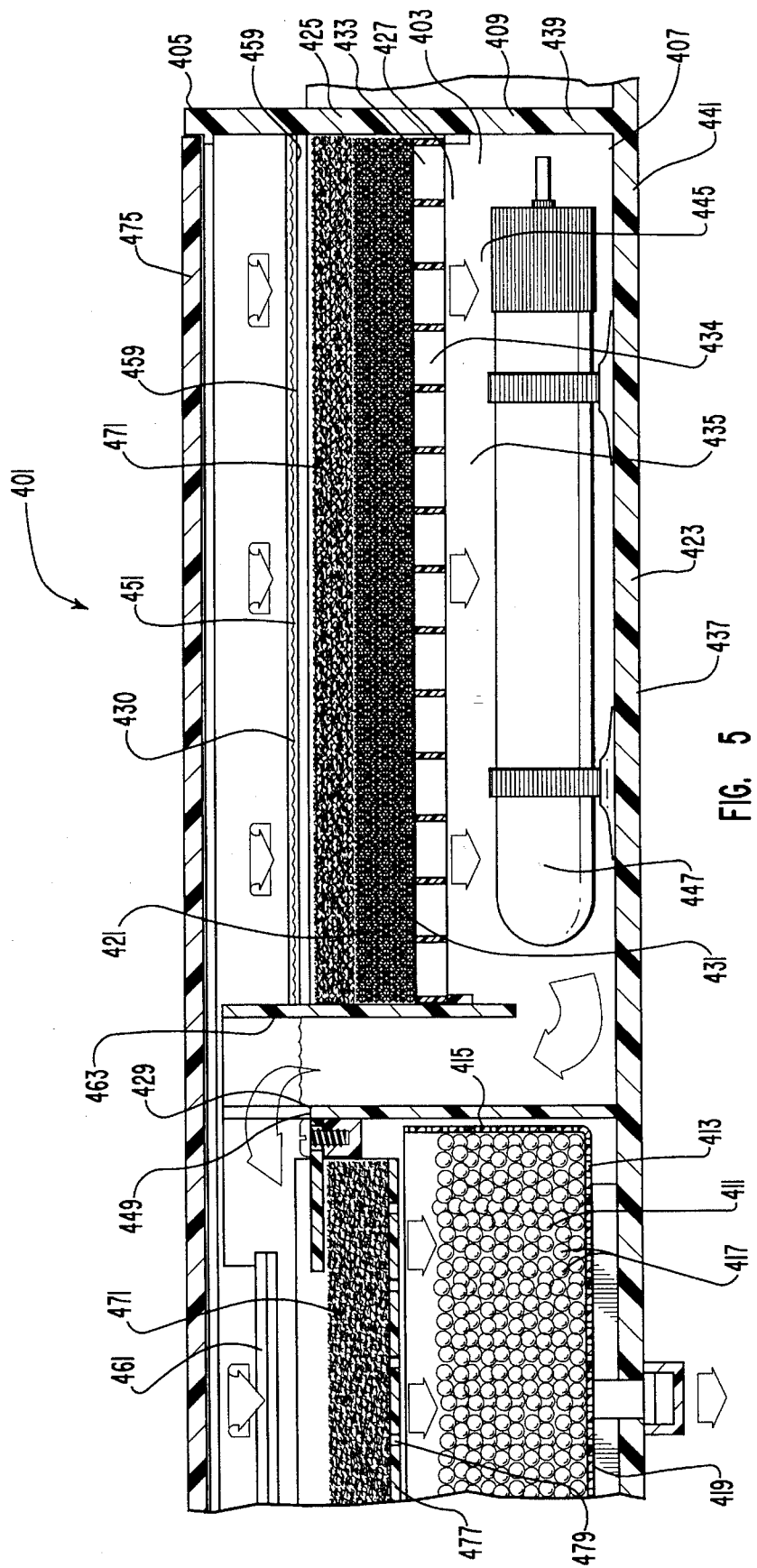
FIG. 5 is a cross-section through 5 in FIG. 2.

A heater chamber 435 comprises a bottom panel 437 and side panels 439 extending upward from the bottom panel 441, thus defining a containment 445 constructed and arranged to contain a submersible water heater 447. At least one of the side panels 439 has an overflow weir 449 constructed and arranged to maintain a predefined water level 451 to keep the submersible heater 447 submerged below the water level 451. Referring also to FIG. 5, which shows half of the dry section 411, and one of the wet sections 421 in cross-section, the heater chamber containment 445 is common with the wet section containment 427, and the wet section overflow weir 429 accordingly also functions as the heater chamber overflow weir 449. The wet section 421 also comprises a curtain wall 463 that helps contain the wet medium 431 and directs water flowing from the wet section weir through the wet medium 431, and a wet medium support plate 433. The wet medium support plate 433 also supports the wet medium. The support plate 433 is water permeable, having apertures 434 to allow the water to pass through the support plate 433.

An inlet conduit 453 including a pump means 455 is provided for directing water from the aquarium to a water inlet 457 of the main chamber 403.

A channel 458 within the main chamber provides a path for water flow from the inlet 457 to the wet section 421 and to the dry section 411. The channel 458 includes a wet section inlet weir 459 and a dry section inlet weir 461. The wet section 421 is disposed relative to the wet section inlet weir 459 so that water flowing from the channel 458 over the wet section weir 459 flows into the wet section 421. Likewise, the dry section 411 is disposed relative to the dry section weir 461 so that water flowing from the channel 458 over the dry section weir 46 flows into the dry section 411.

Referring to FIGS. 1 and 2, flow restrictors 465 are placed in the channel 458 to increase the flow of water over the wet section inlet weirs 459. The flow restrictors 465 are in the form of panels 467 with apertures 469 large enough to allow some water to flow through the panel, but small enough to increase the water head on the upstream (wet section inlet weir) side of the panel. The water flow through the apparatus is more fully explained below. The water flow can also adjusted by the relative heights of the inlet weirs. In FIG. 1, the wet, section inlet weirs 459 are shown lower than the dry section inlet weir 461, which favors water flow into the wet sections. Alternately, the wet section inlet weirs 459 can be the same height or higher as the dry section inlet weirs 461. The height of the inlet weirs can be determined upon manufacture of the apparatus, or can be made adjustable by removable strips or inserts that fit over the top of the side wall of the inlet weir, or by means of a sliding panel or panels on the side wall with the inlet weir. Any suitable form or adjusting or fixing the height of the weirs is contemplated. By combining suitable flow restrictors and adjustable inlet weirs, the division of water flow between the dry inlet weirs and the wet inlet weirs can be continuously adjusted from all the water going to the wet inlet weir to all the water going to the dry inlet weir. In priorart systems, this is not possible, as the construction is usual a linear arrangement with the water flowing sequentially from one stage to the next. In the present invention, the use of the channel connecting all the stages of flow together allows infinite variation in the water flow, depending upon the needs of the user. It is also contemplated that other sections, s such as a heater chamber can be connected to the channel with an inlet weir in like manner as the wet section and dry section.

Referring to FIGS. 1 and 2, the apparatus of the invention may also include filter glass floss 471, or like material, overlaying either or both the wet section medium 431 and the dry section medium 417. In order to distribute the trickling water through the dry section medium 417, a distribution plate 477 or other distribution means may be provided, such as the apertured plate illustrated. The distribution plate 477 may also function as the support for the floss 471. It is also contemplated to place a course filter material 473, such as a open cell foam with large pores, in the channel. Such a filter material will not materially impede the flow of water, but will provide filtering for course materials before they can enter either the dry or wet sections. Preferably, the top end 405 of the main chamber 403 is covered with a top lid 475.

Figure 3:
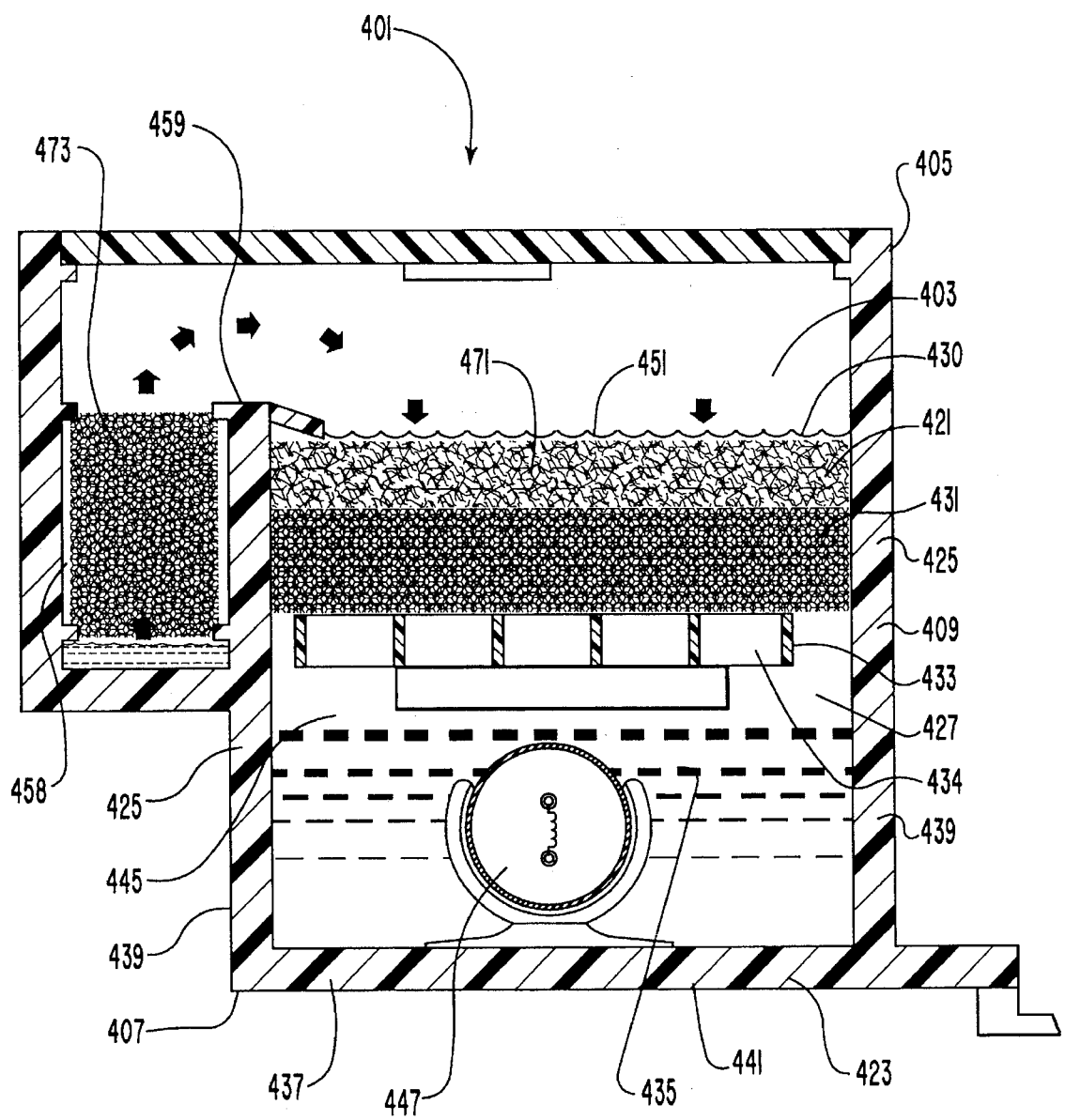
FIG. 3 is a cross-section through 3 in FIG. 2.

The flow path of the water will now be illustrated by reference to FIGS. 1 to 5, in particular FIGS. 3 to 5. The water flow is shown in the figures by flow arrows. Water from the inlet conduit 453 flows into inlet 457 (FIG. 10) into the channel 458 containing course filter material 473. Water flows from the channel over the dry section inlet weir 461 (FIG. 10), and the wet section inlet weir 459 (FIG. 9). In the wet section (FIGS. 9 & 11), water flowing over the wet section inlet weir 459 flows down through the floss filter material 471, the wet medium 431, and the apertures 434 in the wet medium support plate 433. The water then passes past an electrical heater 447. The containments 445, 427 for the heater chamber and the wet section are common in the illustrated embodiment, and the water level therein is determined by the height of the common overflow flow weir 449, 429. Water flows over this overflow weir 449, 429 from the wet section/heater chamber containment 445, 427 into the dry section 411.

Figure 4:
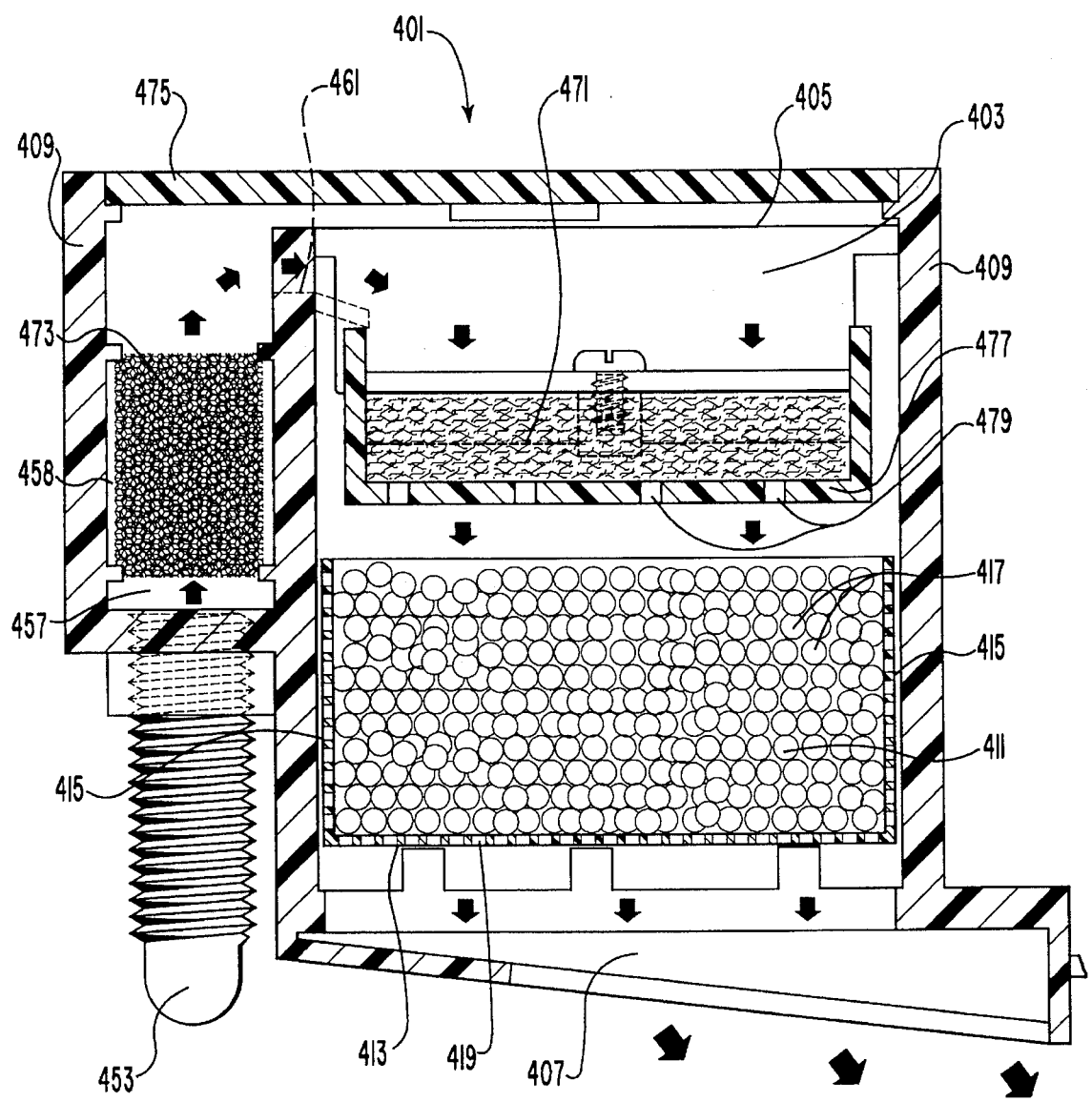
FIG. 4 is a cross-section through 4 in FIG. 2.

Referring to FIGS. 4 and 5, water flows into the dry section 411, not only from the wet section 421, but also from the channel over the dry section inlet weir 461. The water flows through floss material 471 onto the distribution plate 477. Water flows through the apertures 479 of the distribution plate onto the dry medium 417. After trickling through the dry medium, the water flows through the apertures 419 of the dry section plate 413, and into the aquarium (not illustrated.) The above described water flow is one illustration of how water can flow through the apparatus of the invention. It is understood, that other variations are possible consistent with the above discussion.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. An apparatus for cleaning water that is contained in an aquarium, the aquarium constructed and arranged to provide an upper surface of the water, the apparatus comprising;

(a) a main chamber with a top end and a bottom end and defined as the volume enclosed by generally vertically aligned side-walls disposed above the surface of the water of the aquarium, (b) a dry section disposed within the main chamber defined by a bottom dry section plate aligned in a generally horizontal alignment with dry medium containment walls extending from the dry section plate constructed and arranged to contain a dry medium, the dry section plate having a means constructed and arranged for the passage of sufficient water through the plate such that water trickles through the dry medium with at least a major portion of the dry medium being not submerged in water during operation of the apparatus, (c) a wet section disposed within the main chamber with a wet section bottom plate and wet section sidewalls extending upward from the wet section bottom plate defining a containment for water, at least one side wall having an overflow weir for maintaining a predefined water level in the containment, and a wet medium with the major portion of the wet medium disposed to be submerged below the water level in the wet section.

(d) an inlet conduit including a pump means for directing water from the aquarium to a water inlet of the main chamber, and (e) a channel within the main chamber to provide a path for water flow from the inlet to the wet section and the dry section, the channel including a wet section inlet weir and a dry section inlet weir with the wet section disposed relative to the wet section inlet weir such that water flowing from the channel over the wet section inlet weir flows into the wet section, and with the dry section disposed relative to the dry section inlet weir such that water flowing from the channel over the dry section inlet weir flows into the dry section.

2. The apparatus of claim 1 wherein the height of the wet section weir and the dry section weir are essentially equal.

3. The apparatus of claim 1 wherein the dry section weir is higher than the wet section weir.

4. The apparatus of claim 1 wherein the wet section weir is higher than the dry section weir.

5. The apparatus of claim 1 wherein the dry section inlet weir is disposed along the water flow path of the channel between the wet section inlet weir and the inlet, and a flow restrictor is disposed in between the wet section inlet weir and dry section inlet weir to redirect water that would otherwise flow over the wet section inlet weir to flow over the dry section inlet weir.

6. The apparatus of claim 1 wherein the wet section inlet weir is disposed along the water flow path of the channel between the dry section inlet weir and the inlet, and a flow restrictor is disposed in between the dry section inlet weir and wet section inlet weir to redirect water that would otherwise flow over the dry section inlet weir to flow over the wet section inlet weir.

7. The apparatus of claim 1 wherein the inlet is disposed along the water flow path of the channel between the dry section inlet weir and the wet section inlet weir, and a flow restrictor is disposed in between the dry section inlet weir and the inlet to redirect water that would otherwise flow over the dry section inlet weir to flow over the wet section inlet weir.

8. The apparatus of claim 1 wherein the inlet is disposed along the water flow path of the channel between the dry section inlet weir and the wet section inlet weir, and a flow restrictor is disposed in between the wet section inlet weir and the inlet to redirect water that would otherwise flow over the wet section inlet weir to flow over the dry section inlet weir.

9. The apparatus of claim 1 wherein the dry section and main chamber are constructed and configured such that the dry section plate is the same as a bottom plate of the main chamber.

10. The apparatus of claim 1 wherein the dry section is constructed and configured within the main chamber such that at least one of the containment walls of the dry section is the same as one or more of the side walls of the main chamber.

11. The apparatus of claim 1 wherein the wet section is constructed and configured in the main chamber such that the wet section bottom plate is the same as a bottom plate of the main chamber.

12. The apparatus of claim 1 wherein the wet section is constructed and configured within the main chamber such that at least one of the sidewalls of the wet section is the same as one or more of the side walls of the main chamber.

13. The apparatus of claim 1 additionally comprising a heater chamber that comprises a bottom panel and side panels extending upward from the bottom panel defining a containment constructed and arranged to contain a submersible water heater, at least one of the sidewalls having an overflow weir constructed and arranged to maintain a predefined water level in the heater chamber with the submersible heater submerged below the water level.

14. The apparatus of claim 13 wherein the heater chamber and the main chamber are constructed and configured such that the bottom plate of the heater chamber is the same as a bottom plate of the main chamber.

15. The apparatus of claim 13 wherein the heater chamber and the main chamber are constructed and configured such that at least one of the sidewalls of the heater chamber is the same as one or more of the side walls of the main chamber.

16. The apparatus of claim 13 wherein the heater chamber is disposed outside of the main chamber and water flows out of the main chamber into the aquarium.

17. The apparatus of claim 1 wherein the dry section and wet section are constructed and configured such that one of the side walls of the dry section is the same as one of the side walls of the wet section.

* * * * *